FIG. 5a
FIG. 5b
FIG. 5c
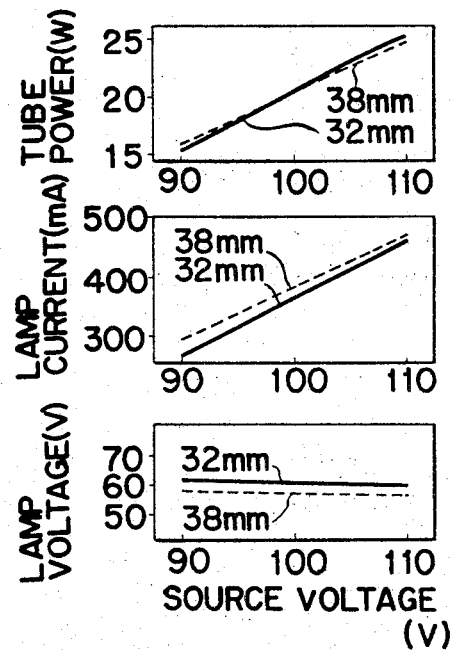
FIG. 6a
FIG. 6b
FIG. 6c
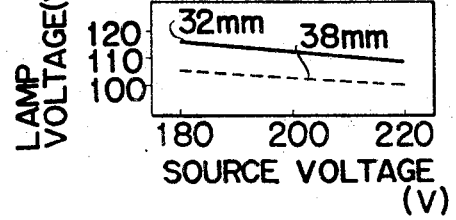

United States Patent Office 3,538,370
Patented Nov. 3, 1970

1

3,538,370
STRAIGHT TYPE FLUORESCENT LAMP HAVING IMPROVED LIGHT OUTPUT AND EXHIBITING REDUCED BLACKENING
Tsunekazu Hashimoto, Tokyo, Akira Someya, Yokohama-shi, and Teizo Hanada, Saitama-ken, Japan, assignors to Tokyo Shibaura Electric Co., Ltd., Kawasaki-shi, Japan, a corporation of Japan
Filed Aug. 27, 1968, Ser. No. 755,579
Int. Cl. H01j 1/62, 63/04
U.S. Cl. 313—109       8 Claims

ABSTRACT OF THE DISCLOSURE

In a straight type fluorescent lamp of a rated wattage of 20 w., 30 w., 40 w. or 65 w. having the total length of about 590 mm. to 1,500 mm. and exchangeable with conventional lamps including sealed glass tubes of 38 mm. outer diameter, the pressure of the sealed rare gas is selected to a value ranging from 0.5 mm. Hg to 3.2 mm. Hg, preferably from 0.5 mm. Hg to 2.5 mm. Hg for a tube outer diameter of 29 mm., from 0.5 mm. Hg to 2.8 mm. Hg for tube outer diameters ranging from 29 mm. to 32 mm., and 0.5 mm. Hg to 3.2 mm. Hg for tube outer diameters ranging from 32 mm. to 35 mm. to increase the total lumen output and the diameter of the tungsten wire of the sealed coil electrode is selected to a value ranging from 12.0 mg. to 14.0 mg. ("mg." represents the weight in milligram of 200 mm. of said tungsten wire) for a rated wattage of 20 w., from 14.5 mg. to 17.0 mg. for 30 w., from 17.0 mg. to 19.5 mg. for 40 w., and from 52.0 mg. to 67.0 mg. for 65 w. to decrease the blackening phenomenon.

This invention relates to fluorescent lamps and more particularly to improved straight type fluorescent lamps of a rated wattage of 20 w., 30 w., 40 w. or 65 w. having tube outer diameters of from 29 mm. to 35 mm. and total lengths of from about 590 mm. to about 1,500 mm.

Straight type fluorescent lamps now widely used in dwelling houses have a rated capacity of 20 watts to 65 watts, an outer diameter of about 38 mm. and a total length of from about 590 mm. to 1,500 mm. depending upon the rating of the lamp. These lamps have electrodes spaced from about 30 mm. to 40 mm. from their base faces and contain an inert rare gas such as argon sealed at a pressure of about 3 mm. Hg in addition to a small quantity of mercury.

Ratings of fluorescent lamps and ballasts thereof are determined by IEC (International Electrotechnical Commission) as shown in the following table (see Publication 81, Tubular Fluorescent Lamps for General Lighting Service and Publication 82, Ballasts for Fluorescent Lamps).

2

Since fluorescent lamps fabricated under said specification are now widely used, any improved fluorescent lamps should be interchangeable with these conventional lamps. In other words, it is necessary that presently used lighting fixtures might be used for such improved fluorescent lamps.

It is an object of this invention to provide improved fluorescent lamps perfectly interchangeable with presently used fluorescent lamps and having improved light outputs and at least the same or longer operating life with decreased blackening phenomenon.

According to the present invention, this object can be attained by providing a straight type fluorescent lamp of a rated wattage of 20 w., 30 w., 40 w. or 65 w. comprising a light transmissive sealed glass tube, a phosphor layer formed on the inner surface of said glass tube, a quantity of mercury and an inert rare gas sealed in said glass tube, a pair of coil electrodes including a pair of welds sealed at the opposite ends of said glass tube and filaments connected between said welds, and a pair of bases with pairs of pins and mounted on the opposite ends of said glass tube, the outer diameter of said glass tube ranging from 29 to 35 mm., the pressure of said sealed inert gas ranging from 0.5 to 3.2 mm Hg, characterized in that the total length of said lamp measured between outer faces of said bases is 588.7 ± 1.0 mm. for the rated wattage of 20 watts, 893.5 ± 1.0 mm. for 30 watts, 1,198.0 ± 1.0 mm. for 40 watts and 1,498.8 ± 1.2 mm. for 65 watts, and that the diameter of the wire of said filaments ranges from 12.0 mg. to 14.0 mg. for the rated wattage of 20 watts, from 14.5 mg. to 17.0 mg. for 30 watts, from 17.0 mg. to 19.5 mg. for 40 watts and 52.0 mg. to 67.0 mg. for 65 watts The present invention can be more fully understood from the following description when taken in connection with the accompanying drawings, in which:

FIGS. 5a to 5c and FIGS. 6a to 6c are graphs to compare source voltage versus various lamp characteristics of the lamp and the conventional lamp, FIGS. 5a to 5c being for 20 watts and FIGS. 6a to 6c being for 40 watts.

TABLE 1

| | Nominal dimensions (mm.) | | Characteristics of reference ballast | | | |
|---|---|---|---|---|---|---|
| Rated wattage (w.) | Length | Diameter | Rated voltage (v.) | Reference current (a.) | Ratio voltage/current (ohms) | Power factor |
| 20 | 590 | 38 | 127 | 0.37 | 270 | 0.12 |
| 30 | 910 | 38 | 220 | 0.405 | 460 | 0.10 |
| 40 | 1,200 | 38 | 220 | 0.43 | 390 | 0.10 |
| 65 | 1,500 | 38 | 220 | 0.67 | 240 | 0.10 |

Although these data of fluorescent lamps have been considered appropriate from the standpoints of their manufacturing, convenience of use, efficiency and operating life, it is still desired to increase the light output or total lumens without decreasing the operating life of the lamp.

taking a combination of the argon pressure sealed in the glass tube and the height of the electrodes sealed in the opposite ends of the tube as the parameters.

In order to obtain straight type fluorescent lamps of increased light output and long operating life we have made a number of experiments and analyses. The result of experiments on 40 watts fluorescent lamps regarding various fluorescent lamp characteristics on which the invention is based will be considered with reference to FIGS. 1a to 1d. In these figures, the abscissa represents the pressure of sealed argon gas ranging from 1.0 mm. Hg to 4.0 mm. Hg and the ordinate represents light output (relative value), lamp power (watt), lamp current (milliampere) and lamp voltage (volt), respectively. Other diameters of glass tubes were 25 mm., 29 mm., 32 mm., 35 mm., 45 mm. and 38 mm. respectively, the last value representing the diameter of presently used fluorescent lamps. The source voltage was 200 volts and the ambient temperature was 20° C.

Ballast characteristics were, in this case, as follows:

Rated voltage (v.) _____ 200
Reference current (a.) _____ 0.435
Impedance (Ω) _____ 341
Power factor _____ 0.075

By the term "the relative value of the light output" is meant the ratio to the light output of the presently used fluorescent lamps of 38 mm. tube outer diameter which is taken as 100%. And also when another reference ballast for 40 watt lamp being listed in Table 1 was used, near the same results as shown in FIG. 1a to 1d was obtained.

Figure 1A:
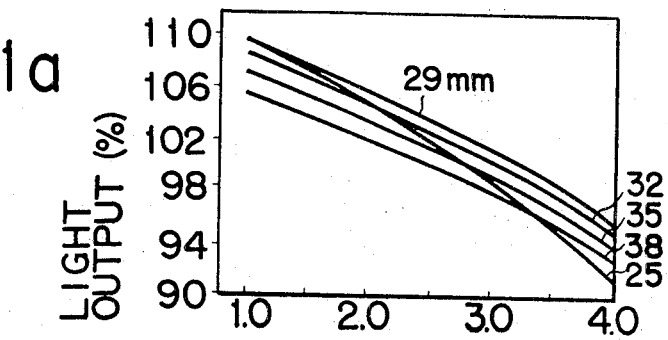
FIGS. 1a to 1d are graphs of sealed argon pressure versus various characteristics of a fluorescent lamp rated at 40 watts, taking the tube outer diameter as the parameter.

As is clearly shown in FIG. 1a, the value of light output is larger for tube outer diameters from 29 mm. to 35 mm. than for a tube outer diameter of 38 mm. throughout the range of argon pressure measured. For tubes of outer diameter of 25 mm., the light output is larger than the tubes of 38 mm. outer diameter in the range less than about 3.5 mm. Hg of argon pressure.

Figure 1B:
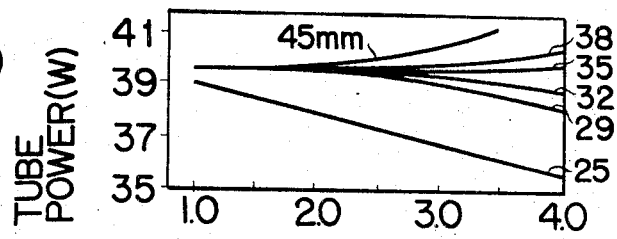

As shown in FIG. 1b, the tube power increases most significantly with the increase of argon pressure for tubes of outer diameter of 45 mm., increases gradually for tubes of outer diameter of 38 mm., while it does not vary in any appreciable amount or decreases gradually for tubes of the outer diameter ranging from 29 mm. to 35 mm. In contrast, in the case of tubes having an outer diameter of 25 mm., the tube power decreases abruptly with increase in the argon pressure and the power does not reach the required value over the entire range of argon pressure measured.

Figure 1C:
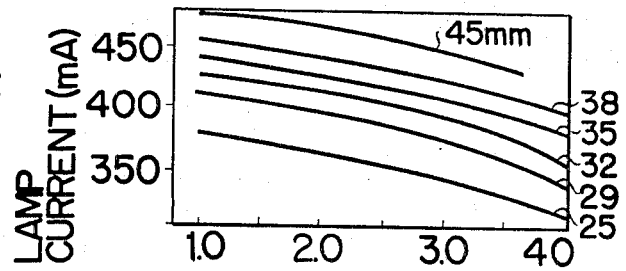

FIG. 1c shows that the lamp current decreases with decrease in the tube outer diameter. For a tube of an outer diameter of 25 mm., the lamp current decreases greatly so that the required lamp power is not consumed as has been discussed in connection with FIG. 1b. Conversely, for a tube of an outer diameter of 45 mm., the lamp current increases greatly so that as shown in FIG. 1c, the lamp power consumed deviates greatly, which means that such tube has no practical value.

Figure 1D:
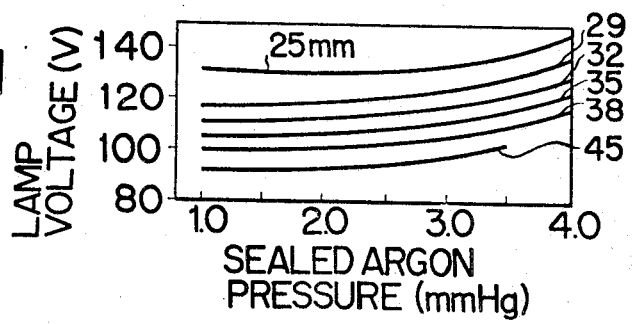

FIG. 1d shows that lamp voltage increases with decrease in the tube outer diameter. With too high lamp voltage, the presently used glow starter has a tendency to operate again during operation of an associated fluorescent lamp so that only tubes having outer diameters more than 29 mm. can be used in actual practice.

Figure 2:
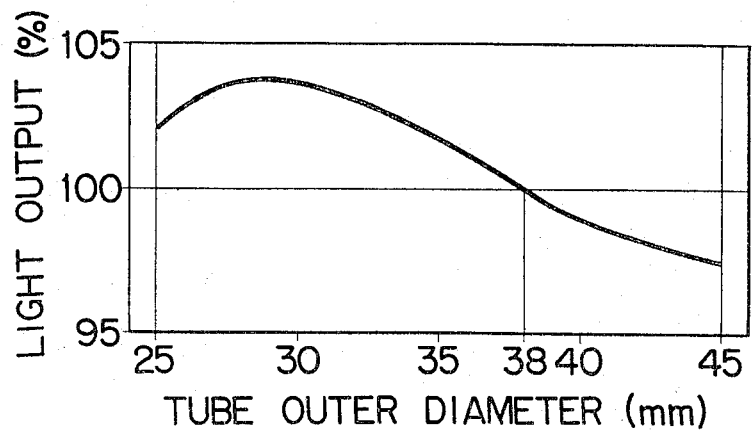
FIG. 2 is a characteristic graph of tube outer diameter versus light output.

FIG. 2 shows the variation in the relative value of light output of fluorescent lamps versus tube outer diameter for a sealed argon pressure of 2.0 mm. Hg. As is evident from this figure the maximum light output can be obtained for a tube outer diameter of 29 mm. and it can be noted that there is a range of tube outer diameter or a range of improved effects around this maximum value in which the light output sufficiently increases beyond that of the presently used lamps having a tube diameter of 38 mm. It was noted that substantially the same light output relative value curve could be obtained for sealed argon pressure other than 2.0 mm. Hg.

The result of another experiment has shown that where the sealed argon pressure is lower than 0.5 mm. Hg, the increase in the starting voltage, deterioration in performance characteristics and the decrease in life are remarkable regardless of the value of tube outer diameter. These undesirable phenomena are well known to one skilled in the art.

Analysis of these results of experiments shows that, in order to provide fluorescent lamps exchangeable with presently used lamps and having increased light output, it is necessary to select the tube outer diameter to a value in a range of from 29 mm. to 35 mm. and to control the sealed rare gas pressure with reference to the tube outer diameter in the following manner without altering the total length of the lamp. More particularly, it was found that these objects could be attained by selecting the sealed inert rare gas pressure to a value in a range of from 0.5 mm. Hg to 3.2 mm. Hg, preferably to be less than 2.5 mm. Hg for a tube outer diameter of 29 mm., less than 2.8 mm. Hg for tube outer diameters of from 29 mm. to 32 mm. and less than 3.2 mm. Hg for tube outer diameters of from 32 mm. to 35 mm. As the standard wall thickness of glass tubes utilized in fabricating fluorescent lamps equals to 0.8 mm., the inner diameter of the tubes equals to the outer diameter minus twice wall thickness.

The light output of fluorescent lamps with such controlled tube outer diameter and sealed inert rare gas pressure is greatly improved over that of lamps having an outer diameter of 38 mm., and yet such improved lamps have sufficient interchangeability with conventional lamps. Further, reduction of the tube outer diameter results in such advantages as the reduction of costs of various materials required to fabricate lamps, packing, transportation and storage.

However, the fluorescent lamps of smaller tube outer diameters thus obtained will generally exhibit lower lamp currents than those of the presently used fluorescent lamps of a tube outer diameter of 38 mm., when operated on the conventional operating circuits. Typical examples are mentioned in the following Table 2.

TABLE 2

| Rated wattage (w.) | Outer diameter of tube (mm.) | Lamp current (ma.) |
|---|---|---|
| 20 | 38 | 375 |
|  | 32 | 360 |
| 30 | 38 | 405 |
|  | 32 | 387 |
| 40 | 38 | 435 |
|  | 32 | 417 |
| 65 | 38 | 670 |
|  | 32 | 650 |

NOTE.—All the fluorescent lamps in this table were sealed with 2 mm. Hg of argon.

It was observed that where the lamp current is lower by 15 ma. to 20 ma. as shown in the above table, and if the same cathodes as those for 38 mm. φ lamps were used, cathode spots will be difficult to be normally formed. It was also observed that when the source voltage becomes lower than the rated value, the cathode spot will no longer be normally maintained, whereby the starting of the lamp becomes unreliable and the blackening phenomenon arises at an early stage to shorten the life of the lamp.

We have experimentally investigated the relationship between the diameter of filament tungsten wires of coil electrodes and occurrence of the blackening phenomenon, and found that blackening could be prevented positively by selecting the tungsten wire diameter to a value ranging from 12.0 mg. to 14.0 mg. ("mg." represents the weight in mg. of 200 mm. of said tungsten wire) for a rated wattage of 20 w., from 14.5 mg. to 17.0 mg. for 30 w., from 17.0 mg. to 19.5 mg. for 40 w., and from 52.0 to 67.0 mg. for 65 w.

Figure 3:
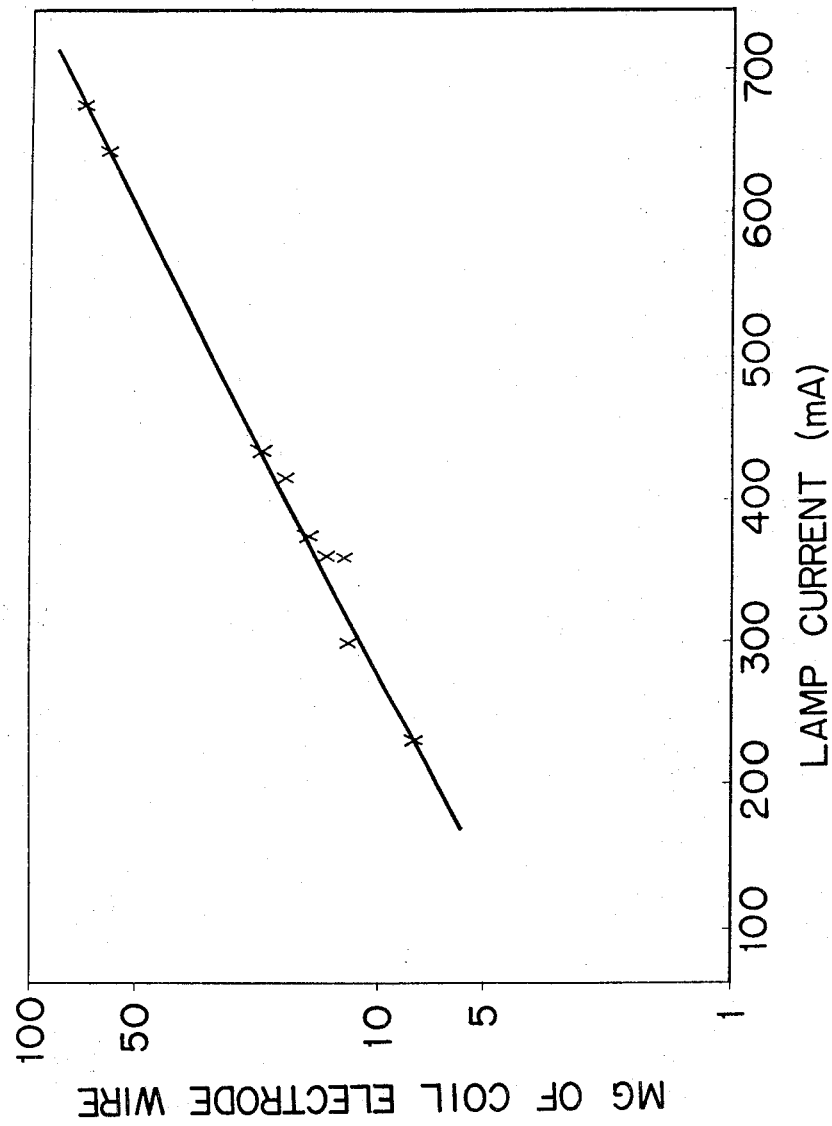
FIG. 3 is a semi-logarithmic graph of plots showing the relationship between the lamp current and the filament tungsten wire diameter.
Figure 7A:
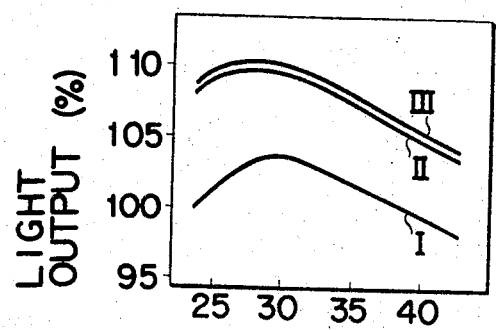
FIGS. 7a to 7d are graphs showing various characteristics of the fluorescent lamp versus tube outer diameter
Figure 7B:
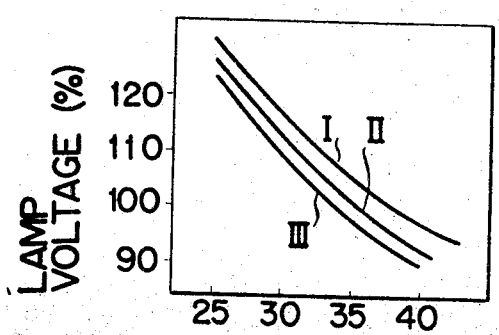
Figure 7C:
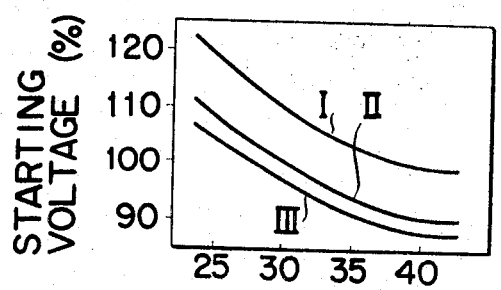
Figure 7D:
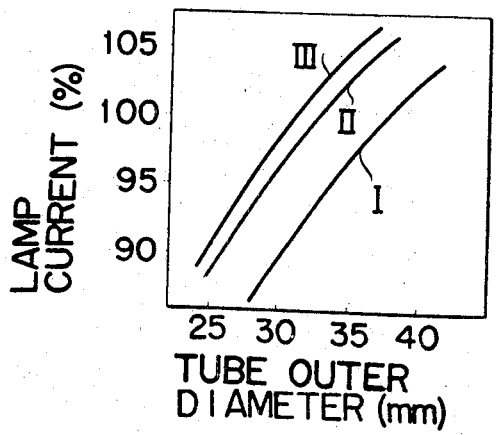

FIG. 3 is a semi-logarithmic graph showing plots of the relationship between the lamp current and the value of mg. of the tungsten wire, said graph having been obtained in one of the experiments made. In the figure, the abscissa represents the lamp current in ma., while the ordinate the mg. value. From the plots there is obtained the following equation.

$$\log_{10}(\text{mg.}) = 2.08 I_L + 0.4185$$

accordingly, $$\text{mg.} = 2.621 \times 10^{2.08 I_L}$$

where, $I_L$ represents the lamp current in ampere.

The graph is not directly related to the specified ranges of the mg. value.

The specified lower limits of the mg. value for the respective rated wattages have been determined by the following fact. Where the tungsten wire diameter is smaller than the lower limits, the cathode spot temperature is excessively raised, whereby an anode spot is produced at an early stage to make short the life of the lamp.

On the other hand, the specified upper limits of the mg. value have been established as follows. Where the diameter exceeds the upper limits, the cathode spot can not be elevated in temperature to a required one, whereby not only an end band tends to be easily produced, but also the lamp starting becomes unreliable in case the source voltage is lower than the rated value thereof to shorten the life of the lamp.

As to the specified ranges of the mg. value, the following consideration may be possible.

The specified mg. values of the filament wire diameter are smaller than the mg. values of the conventional lamps, said latter values being 15.25 for a rated wattage of 20 w., 18.0 for 30 w., 21.5 for 40 w. and 71.0 for 65 w. This makes smaller the heat capacity of the filament of the lamps according to this invention, with the result that the cathode spot temperature is maintained at a normal value even under conditions of low lamp currents. Although a conventional fluorescent lamp, when reduced in the filament wire diameter, undergoes an excessive elevation in temperature during operation whereby blackening phenomena are frequently produced to shorten the life of the lamp, the lamp of the present invention exhibits lower lamp currents and then overcomes the above-mentioned drawback by the reduction of the tungsten wire diameter.

With reference to Table 3, showing the IEC standard for lengths of fluorescent lamps, the lengths of the lamps will be stated.

TABLE 3

| Rated lamp wattage (w.) | Face to face max. (mm.) | Pin to pin max. (mm.) | Face to pin |
| --- | --- | --- | --- |
| 20 T12 | 589.8 | 604.0 | 594.5–596.9 |
| 30 T12 | 894.6 | 908.8 | 899.3–901.7 |
| 40 T12 | 1,199.4 | 1,213.6 | 1,204.1–1,206.5 |
| 65 T12 | 1,500 | 1,514.3 | 1,504.8–1,507.1 |

Since the fluorescent lamps of the present invention have as one of various features exchangeability with the presently used lamps, the total length between outer end surfaces of bases excluding base pins or the length of face to face is defined to be 588.7±1.0 mm. for a rated wattage of 20 w., 893.5±1.0 mm. for 30 w., 1,198.0±1.0 mm. for w. 1,498.8±1.2 mm for 65 w., to meet the standardized requirements.

Figure 4:
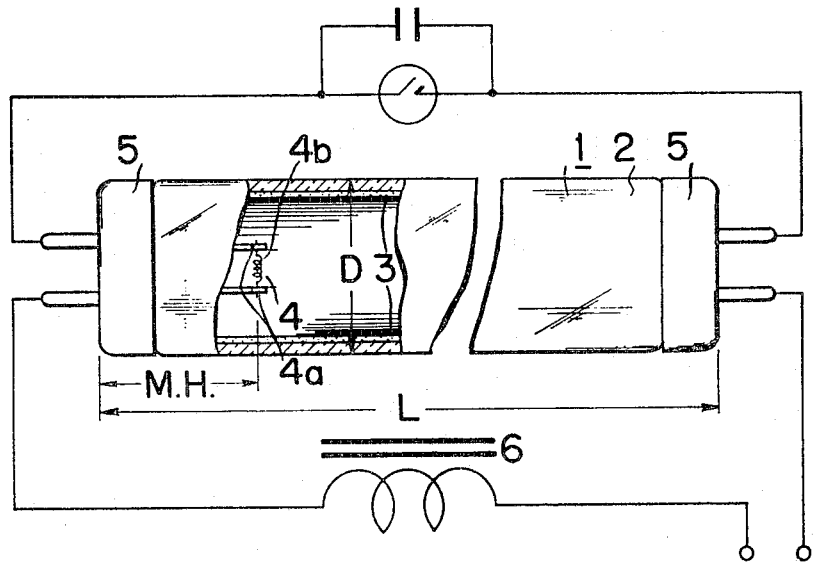
FIG. 4 shows a connection diagram of a fluorescent lamp device utilizing the fluorescent lamp, partly in section.

Turning now to FIG. 4, a fluorescent lamp device comprising the fluorescent lamp and a conventional operating circuit will be described. The fluorescent lamp 1 comprises a light transmissive, preferably transparent sealed glass tube 2 having a tube outer diameter D ranging from 29 mm. to 35 mm. The glass tube is provided with a phosphor layer 3 deposited on the inner surface thereof by a conventional method, coil electrodes 4 sealed in the opposite ends and bases 5 with a pair of pins at the opposite ends, a suitable quantity of mercury and an inert rare gas being sealed in the glass tube. The total length L between outer end surfaces of bases excluding base pins equals, as described above, 588.7±1.0 mm. for a rated wattage of 20 w., 893.5±1.0 mm. for 30 w., 1,198.0±0.1 mm. for 40 w. and 1,498.8±1.2 mm. for 65 w. As also described hereinabove, the pressure of the sealed gas is selected to a suitable value ranging from 0.5 mm. Hg to 3.2 mm. Hg depending upon the tube outer diameter selected. Each of coil electrodes 4 comprises a pair of wires or welds 4a, 4a, a tungsten coiled coil filament 4b welded or mechanically clamped to the inner ends of the lead wires and an electron emissive substance coated upon the coil filament. The wire diameter in mg. of the filament 4b, as yet also mentioned above, ranges from 12.0 to 14.0 for a rated wattage of 20 w., from 14.5 to 17.0 for 30 w. from 17.0 to 19.5 for 40 w. and from 52.0 to 67.0 for 65 w. In the figure M.H. represents the height at which the coil electrode 4 is mounted, said height being measured from the outer face of the base 5. The electrode height will be hereinbelow referred to.

When combined with a conventional ballast 6 adapted to be used for a conventional fluorescent lamp of 38 mm. outside diameter of a given rated wattage, a fluorescent lamp of the same rated wattage, having a total length, tube outer diameter, sealed rare gas pressure and filament wire diameter, all designed to be in the controlled ranges, could be used in the ordinary operating circuit which is shown in FIG. 4 as a preheat start type including a glow starter.

In order to have more perfect understanding of this invention, specifiic examples are given below.

EXAMPLE 1

According to this invention, a fluorescent lamp having a rated wattage of 20 watts was fabricated. The lamp had a total length L of 588.7 mm. and an outer diameter of glass tube of 32 mm. The electrodes 4 with a filament wire diameter of 13.5 mg. were disposed at the opposite ends of the glass tube or at positions spaced 45 mm. from the base faces, and a suitable quantity of mercury and argon of a pressure of 2 mm. Hg were sealed in the glass tube. This fluorescent lamp was connected to a testing ballast or a chock-coil for a conventional fluorescent lamp of 20 watts and operating tests were carried out to compare this lamp with a conventional 20 w. fluorescent lamp. The result of the test showed that the lamp voltage, starting voltage and the lamp current of the conventional lamp were 50 v., 80 v. and 375 ma., respectively, whereas these values of the lamp were 58 v., 80 v. and 360 ma., respectively. These latter values can be satisfied by the conventional operating apparatus. Light output and lamp efficiency were increased considerably. Thus 1,120 lm. and 56 lm./w. for the conventional lamp were increased to 1,200 lm. and 60 lm./w., respectively. This fluorescent lamp showed no anode spot and end band after operation of 5,000 hours. Thus, the effective life of the lamp is substantially equal to or longer than that of the conventional lamp having an average life of about 5,000 hours and exhibiting an average life of about 7,500 hours under a normal operating condition.

Further, fluorescent lamps were fabricated under the same specification as said fluorescent lamp of this invention except that the filament wire diameter was the same as that of conventional lamps, i.e., 15.25 mg. Upon testing their operating characteristics, annular end bands of blackish brown were noted on the tube inner wall spaced 30 mm. to 50 mm. ahead from the coil electrodes after operation of 2,000 hours.

EXAMPLE 2

According to this invention, a fluorescent lamp having a rated wattage of 30 w. was fabricated. The lamp had a total length L of 893.5 mm. and an outer diameter of glass tube of 32 mm. The electrodes 4 with a filament wire diameter of 1.5 mg. were disposed at the opposite ends of the glass tube or at positions spaced 45 mm. from the base faces, and a suitable quantity of mercury and argon of a pressure of 2.0 mm. Hg were sealed in the glass tube. Operating tests were made to compare this fluorescent lamp with a conventional one. The result of the test showed that the total output of the conventional lamp was 2,000 lm., whereas that of the lamp of this invention was 21,180 lm. As regards the life, there was obtained substantially the same result as in Example 1.

Further fluorescent lamps were fabricated under the same specification as said fluorescent lamp of this invention except that the filament wire diameter was the same as that of conventional lamps, i.e., 18.0 mg. Upon testing their operating characteristics, substantially the same result as in Example 1 was obtained.

EXAMPLE 3

According to this invention, a fluorescent lamp of a a rated wattage of 40 w. was fabricated. This lamp had a total length L of 1,198.0 mm. and tube outer diameter of 32 mm., and the electrode 4 with a filament wire diameter of 18.5 mg. were disposed at positions 40 mm. spaced from the base outer faces. A suitable quantity of mercury and argon under a pressure of 2 mm. Hg were sealed in the glass tube. Operating tests were made on this fluorescent lamp and on the conventional 40 w. fluorescent lamp with a testing ballast for the conventional lamp of 40 w. and it was found that the light output of the lamp was increased to 3,200 lm. from 2,850 lm. of the conventional lamps. With regard to the operating life the same satisfactory result as shown in Example 1 was obtained.

Further fluorescent lamps were fabricated under the same specification as the lamp except that the filament wire diameter was the same as the conventional value of 21.5 mg. and operating tests were made on these lamps. Anode spots were noted after operation of 2,000 to 3,000 hours.

EXAMPLE 4

According to this invention, a fluorescent lamp of a rated wattage of 65 w. was fabricated. This lamp had a total length L of 1,499.0 mm. and a tube outer diameter of 32 mm. The electrodes 4 with a filament wire diameter of 60.0 mg. were disposed at the opposite ends of the glass tube at positions spaced 40 mm. from the base faces, and a suitable quantity of mercury and argon of a pressure of 2 mm. Hg were sealed in the glass tube. Operating tests revealed that the total light output of the conventional lamp was 4,600 lm., whereas that of the lamp of this invention was advantageously 5,000 lm. There was obtained substantially the same result as in Example 1, with respect to the operating life.

Further fluorescent lamps were fabricated under the same specification except that the filament wire diameter was the same as in the conventional 65 w. lamps, i.e., 71.0 mg. Their operating tests revealed that anode spots were caused to appear after operation of 2,000 to 3,000 hours.

Fluorescent lamps of rated wattages of 20 w. and 40 w. shown in Examples 1 and 3 and conventional fluorescent lamps of 38 mm. outer diameter were combined with said ballasts, respectively, and various lamp characteristics were compared by varying the source voltage, the results of comparison being shown in FIGS. 5a to 5c and FIGS. 6a to 6c. As can be clearly noted from these figures, the lamp currents of the lamps are slightly lower and the lamp voltages are slightly higher than those of the conventional lamps. Above mentioned rise in the lamp voltage has a tendency to cause undesirable effect for preheat starting utilizing the glow starter. To investigate this effect starting test was made and satisfactory starting characteristics were obtained with the glow starter having a reclosure voltage of over 130 v. for 40 w. lamps for use in 200 v. circuits whereas over 65 v. for 20 w. lamps for use in 100 v. circuits. When considering the facts that as the reclosure voltage of the glow starter approaches the lamp voltage, fluorescent lamps become difficult to start and that the source voltage may become lower than the rated value, it is advantageous to select the inoperative limit voltage of the glow starter to be combined with the lamp to a value more than 65% of the rated source voltage.

It was confirmed that the fluorescent lamps could be started at a voltage of 94% of the rated source voltage even when the ambient temperature was 0° C.

As has been described, in order to increase the light output of the fluorescent lamp the tube outer diameter was reduced and the pressure of the sealed rare gas was also reduced than in the conventional lamps, reduction in the tube outer diameter generally accompanies a decrease of the lamp current and lamp watts so that design of the lamp may become difficult depending upon the rated wattage of the lamp. Such a tendency is particularly significant in the case of 20 w. lamps, for example. In such a case, the distance between electrodes should also be considered. Reduction of the electrode distance tends to increase the lamp current whereas to decrease the lamp voltage and the starting voltage. In the conventional fluorescent lamps, the height of the electrode (M.H. in FIG. 4) or the distance between the outer surface or the face of the base and the electrode ranges from 30 mm. to 40 mm. but the design becomes easier when this distance is seelcted to a value in a range between 40 mm. and 50 mm., thus readily providing fluorescent lamps perfectly interchangeable with lamps presently used. FIGS. 7a to 7d are graphs showing tube outer diameter versus variations (relative values) in the various characteristics of 20 w. fluorescent lamps with varying pressure of sealed argon gas and varying electrode height. In these figures, curves I represent characteristics of lamps with a pressure of sealed argon of 3 mm. Hg and an electrode height of 40 mm., curves II those for a sealed argon pressure of 1.5 mm. Hg and an electrode height of 40 mm. and curves III those for a sealed argon pressure of 1.5 mm. Hg and an electrode height of 45 mm. As can be noted from these curves, in the cases represented by curves II and III, the light output is considerably higher, both lamp voltage and starting voltage are lower and the lamp current is larger than the cases represented by curves I. Thus, it will be clear that the light output of the fluorescent lamp is greatly improved while maintaining interchangeability with conventional fluorescent lamps.

What is claimed is:

1. In a straight type fluorescent lamp having a rated wattage of approximately 20 watts comprising a light transmissive sealed gas tube having an outer diameter ranging from 29 to 35 mm., a phosphor layer formed on the inner surface of said glass tube, a quantity of mercury and an inert rare gas sealed in said glass tube, the pressure of said sealed inert gas ranging from 0.5 mm. Hg to 3.2 mm. Hg, a pair of coil electrodes including a pair of welds sealed at the opposite ends of said glass tube and filaments connected between said welds, and a pair of bases, each having a pair of pins, mounted on the opposite ends of said glass tube,
    the improvement wherein the total length of said lamp measured between the outer faces of said bases is 588.7±1.0 mm., and the diameter of the wire of said filaments corresponds to the diameter of tungsten wire which ranges from 12.0 mg. to 14.0 mg.

2. A straight type fluorescent lamp according to claim 1, the improvement wherein the height of said coil electrodes ranges between 40 mm. and 50 mm.

3. In a straight type fluorescent lamp having a rated wattage of approximately 30 watts comprising a light transmissive sealed glass tube having an outer diameter ranging from 29 mm., to 35 mm., a phosphor layer formed on the inner surface of said glass tube, a quantity of mercury and an inert rare gas sealed in said glass tube, the pressure of said sealed inert gas ranging from 0.5 mm. Hg to 3.2 mm. Hg, a pair of coil electrodes including a pair of welds sealed at the opposite end of said glass tube and filaments connected between said welds, and a pair of bases, each having a pair of pins, mounted on the opposite ends of said glass tube, the improvement wherein the total length of said lamp measured between the outer faces of said bases is 893.5±1.0 mm., and the diameter of the wire of said filaments corresponds to the diameter of tungsten wire which ranges from 14.5 mg. to 17.0 mg.

4. A straight type fluorescent lamp according to claim 3, the improvement wherein the height of said coil electrodes ranges between 40 mm. and 50 mm.

5. In a straight type fluorescent lamp having a rated wattage of approximately 40 watts comprising a light transmissive sealed glass tube having an outer diameter ranging from 29 mm. to 35 mm., a phosphor layer formed on the inner surface of said glass tube, a quantity of mercury and an inert rare gas sealed in said glass tube, the pressure of said sealed inert gas ranging from 0.5 mm. Hg to 3.2 mm. Hg, a pair of coil electrodes including a pair of welds sealed at the opposite ends of said glass tube and filaments connected between said welds, and a pair of bases, each having a pair of pins, mounted on the opposite ends of said glass tube, the improvement wherein the total length of said lamp measured between the outer faces of said bases is 1,198.0±1.0 mm., and the diameter of the wire of said filaments corresponds to the diameter of tungsten wire which ranges from 17.0 mg. to 19.5 mg.

6. A straight type fluorescent lamp according to claim 5, the improvement wherein the height of said coil electrodes ranges between 40 mm. and 50 mm.

7. In a straight type fluorescent lamp having a rated wattage of approximately 65 watts comprising a light transmissive sealed glass tube having an outer diameter ranging from 29 mm. to 35 mm., a phosphor layer formed on the inner surface of said glass tube, a quantity of mercury and an inert rare gas sealed in said glass tube, the pressure of said sealed inert gas ranging from 0.5 mm. Hg to 3.2 mm. Hg, a pair of coil electrodes including a pair of welds sealed at the opposite ends of said glass tube and filaments connected between said welds, and a pair of bases, each having a pair of pins, mounted on the opposite ends of said glass tube, the improvement wherein the total length of said lamp measured between the outer faces of said bases is 1,498.8±1.2 mm., and the diameter of the wire of said filaments corresponds to the diameter of tungsten wire which ranges from 52.0 mg. to 67.0 mg.

8. A straight type fluorescent lamp according to claim 7, the improvement wherein the height of said coil electrodes ranges between 40 mm. and 50 mm.

References Cited
UNITED STATES PATENTS

| | | | |
|---|---|---|---|
| 2,991,386 | 7/1961 | Szigeti et al. | 313—109 |
| 3,462,631 | 8/1969 | Hashimoto et al. | 313—109 |

OTHER REFERENCES

W. Elenbaas: "Fluorescent Lamps and Lighting," 1959, pp. 85–89.

JOHN KOMINSKI, Primary Examiner

D. O'REILLY, Assistant Examiner

U.S. Cl. X.R.
313—217, 220, 344